Patented Oct. 26, 1937

2,096,799

UNITED STATES PATENT OFFICE 2,096,799

TREATMENT OF ARTIFICIAL FILAMENTS, YARNS, RIBBONS AND SIMILAR MATERIALS

Donald Finlayson and Charles Ernest Stafford, Spondon, near Derby, England, assignors to Celanese Corporation of America, a corporation of Delaware No Drawing. Application May 14, 1935, Serial No. 21,377. In Great Britain June 2, 1934

4 Claims. (Cl. 8—13)

This invention relates to improvements in the treatment of artificial filaments, yarns, ribbons and similar materials, and particularly to improvements in weighting and similar operations.

In U. S. Patent No. 1,963,975 and British Patent No. 259,899 processes are described wherein artificial filaments and the like are weighted by causing them when in a swollen condition to absorb metal salts from solution and subsequently treating them with a suitable reagent to fix the metal in the materials. Alternatively, weighting compounds may be incorporated as such in the artificial materials when the materials are in a swollen condition. By such processes products may be obtained which contain substantial proportions of weighting compounds.

While these products may have a breaking strength substantially equal to that of the materials before loading, since by the loading process their weight may be considerably increased, the tensile strength of the loaded materials in grams per denier is in general notably less.

It has now been discovered that artificial filaments, yarns, ribbons and similar materials which are in a swollen condition suitable for the incorporation of weighting substances may simultaneously be stretched. In this manner products may be obtained which are not only weighted, but which also have a tensile strength in grams per denier which is as great as or greater than that of the materials before weighting.

The incorporation of the weighting agent may be carried out in a single stage, e. g. by treating the materials in a bath containing the agent, or it may be formed in the materials by treating them first with a solution of a suitable reagent and then with a medium containing a second reagent which reacts with the first reagent to form the weighting agent. The materials may be brought to a swollen condition by treating them with a swelling agent prior to or simultaneously with the incorporation of the weighting agent, or one of the components of the agent in the case of a two-stage process, and/or by the use of a weighting agent or component which itself has a swelling action on the materials. Again, materials formed by spinning a solution containing a suitable reagent may be caused to absorb the second reagent when in a swollen condition and may be simultaneously stretched.

The degree of stretch may be varied in accordance with the tensile strength and other properties required in the final products. For example, a relatively small stretch may be effected such as 25 or 30% of the original length of the materials, or a greater stretch, for example 100 or 150% of their original length.

The invention is of particular value in relation to the treatment of artificial materials containing cellulose acetate and will therefore be described with particular reference thereto, but it may also be employed in connection with materials containing other organic derivatives of cellulose, for example cellulose formate, propionate, butyrate, nitro-acetate, acetate-propionate and other esters and mixed esters of cellulose, methyl, ethyl, butyl and benzyl cellulose and other cellulose ethers and mixed ethers and mixed ether-esters, for example ethyl cellulose acetate and oxy-ethyl cellulose acetate. It may also be employed in the treatment of other artificial materials, for example artificial materials containing regenerated cellulose such as are obtained by the viscose, cuprammonium and nitrocellulose processes.

The materials may be subjected to the combined operation of stretching and introduction of the required weighting agent or reagent for forming such agent either in hank or other suitable package form or during their travel from one point to another, for example in a bobbin-to-bobbin or other winding or winding and twisting operation. Thus, artificial filaments having a basis of cellulose acetate may be immersed in hank form in a solution having the following composition:—

| | Volumes |
|---|---|
| Stannic chloride solution 50–60° Tw | 90–95 |
| Formic acid | 10–5 | and, while immersed therein, slowly stretched during a period of 20–40 minutes, for example by 100–200%. They may then be rinsed, soaked for 5–15 minutes in disodium phosphate solution of about 10° Tw. and finally washed and dried.

When artificial materials containing organic esters of cellulose are treated they may also be subjected to a saponifying operation. This may be carried out continuously with, but subsequent to, the incorporation of the desired weighting agent. Preferably, however, saponification is effected simultaneously with such incorporation, or with the formation of the agent in the case of a two-stage operation. Thus, in a two-stage process for the formation of the required substance, saponification may be effected simultaneously with the second stage, in which the required substance is formed in the materials, for example by employing a solution containing trisodium phosphate or sodium silicate, and, if desired, caustic soda or similar agent. Thus, artificial materials may be loaded by treating them first with stannic chloride solution as described above and simultaneously stretching them, and then fixing the stannic salt in the form of stannic phosphate and simultaneously saponifying the materials by treating them with a 5-10% solution of trisodium phosphate containing about .5-1% of caustic soda. Alternatively, the materials after the incorporation of the required substance therein, may be subjected to a saponifying operation, for example by treatment with aqueous or alcoholic solutions of caustic soda or other caustic alkali or other inorganic base or with methylamine or ethylene diamine or other organic amine. Suitable processes are described in U. S. Patents Nos. 1,884,622 and 1,884,623, and U. S. applications S. Nos. 655,773 filed 8th February 1933, 655,774 filed 8th February 1933, 668,070 filed 18th April 1933, 709,335 filed 1st February 1934, 752,376 filed 9th November 1934, 756,285 filed 6th December 1934, 756,282 filed 6th December 1934, 756,284 filed 6th December 1934, 329 filed 4th January 1935 and 326 filed 4th January 1935. When saponification is carried out in the presence of organic amines a further stretching may also be simultaneously applied, as described in U. S. application S. No. 756,283 filed 6th December 1934.

Instead of incorporating stannic phosphate in the materials, other suitable substances may be incorporated, for example zinc phosphate or barium sulphate, which may be produced by treating the materials with a solution of barium thiocyanate followed by treatment with a solution of sodium sulphate. Barium thiocyanate has itself a swelling action on cellulose acetate and also on other organic derivatives of cellulose and regenerated cellulose, but, if necessary, it may be employed in conjunction with another swelling agent, for example acetone, dioxane, or a lower fatty acid in the case of organic derivatives of cellulose.

The present invention also includes stretching during other operations in which suitable mineral substances are incorporated in artificial materials when they are in a swollen condition. Thus, stretching may be effected in conjunction with processes for increasing the safe ironing point or fire resistance of artificial materials, for mordanting, as described in U. S. Patent No. 1,874,177, for waterproofing, as described in U. S. Patent No. 1,963,974, or for colouring the materials by means of pigments.

Products obtained according to the present invention may be subjected to any further desired after-treatment processes. Thus, they may be subjected to treatment with shrinking agents as described in U. S. applications S. Nos. 607,667 filed 26th April 1932, 609,255 filed 4th May 1932 and 611,240 filed 13th May 1932.

What we claim and desire to secure by Letters Patent is:—

1. Process for the production of artificial filaments, yarns, ribbons and similar materials having a basis of an organic derivative of cellulose which contain weighting substances and which have an improved tenacity, which comprises swelling the materials with a solution containing stannic chloride and formic acid and simultaneously stretching them while they are in a swollen condition, and then treating the stretched materials with a solution of sodium phosphate so as to precipitate stannic phosphate in the materials.

2. Process for the production of artificial filaments, yarns, ribbons and similar materials having a basis of cellulose acetate which contain weighting substances and which have an improved tenacity, which comprises swelling the materials with a solution containing stannic chloride and formic acid and simultaneously stretching the materials while they are in a swollen condition, and then treating the stretched materials with a solution of sodium phosphate so as to precipitate stannic phosphate in the materials and simultaneously saponify them.

3. Process for the production of artificial filaments, yarns, ribbons and similar materials having a basis of cellulose acetate which contain weighting substances and which have an improved tenacity, which comprises treating the materials with an aqueous solution containing stannic chloride and up to 10% of formic acid, stretching the materials while they are in a swollen condition and then treating the materials with a solution of an agent adapted to react with the said stannic chloride to form an insoluble tin salt in the materials.

4. Process for the production of artificial filaments, yarns, ribbons and similar materials having a basis of cellulose acetate which contain weighting substances and which have an improved tenacity, which comprises treating the materials with an aqueous solution containing stannic chloride and up to 10% of formic acid, stretching the materials while they are in a swollen condition and then treating the materials with a solution of sodium phosphate so as to precipitate stannic phosphate in the materials.

DONALD FINLAYSON.
CHARLES ERNEST STAFFORD.